United States Patent
Meyers et al.

(10) Patent No.: US 9,842,109 B1
(45) Date of Patent: Dec. 12, 2017

(54) ILLUSTRATING CONTEXT SENSITIVE TEXT

(75) Inventors: James D. Meyers, Seattle, WA (US); Gerard Pallipuram, Cupertino, CA (US)

(73) Assignee: Amazon Technologies, Inc., Reno, NV (US)

(*) Notice: Subject to any disclaimer, the term of this patent is extended or adjusted under 35 U.S.C. 154(b) by 1648 days.

(21) Appl. No.: 13/115,939

(22) Filed: May 25, 2011

(51) Int. Cl.
*G06F 17/30* (2006.01)

(52) U.S. Cl.
CPC ........ *G06F 17/30* (2013.01); *G06F 17/30607* (2013.01)

(58) Field of Classification Search
CPC ............ G06F 17/30864; G06F 3/0482; G06F 17/30873; G06F 3/0481; G06F 3/04847; G06F 17/211; G06F 17/30867; G06F 17/00

USPC .......... 707/600–831, 899, 999.001–999.206
See application file for complete search history.

(56) References Cited

U.S. PATENT DOCUMENTS

| | | | |
|---|---|---|---|
| 2005/0114324 A1* | 5/2005 | Mayer .............................. | 707/3 |
| 2008/0033919 A1* | 2/2008 | Arrouye et al. .................. | 707/3 |
| 2009/0076917 A1* | 3/2009 | Jablokov et al. ............... | 705/14 |
| 2009/0228777 A1* | 9/2009 | Henry et al. ................... | 715/230 |
| 2009/0300547 A1* | 12/2009 | Bates et al. .................... | 715/825 |
| 2011/0191368 A1* | 8/2011 | Muzatko ........................ | 707/769 |
| 2011/0270820 A1* | 11/2011 | Agarwal ........................ | 707/709 |

* cited by examiner

*Primary Examiner* — Angelica Ruiz
(74) *Attorney, Agent, or Firm* — Lowenstein Sandler LLP

(57) ABSTRACT

A method and system for illustrating textual content is provided. The method may include identifying textual content to be illustrated, finding at least one illustration corresponding to the context associated with the textual content, and presenting a graphical story combining the textual content with the found illustration to a user.

25 Claims, 9 Drawing Sheets

704 — Once upon a time, there was a little girl who lived in a village near the forest. Whenever she went out, the little girl wore a red riding cloak, so everyone in the village called her Little Red Riding Hood.

One morning, Little Red Riding Hood asked her mother if she could go to visit her grandmother as it had been awhile since they'd seen each other.

706 — "That's a good idea," her mother said. So they packed a nice basket for Little Red Riding Hood to take to her grandmother.

708 — When the basket was ready, the little girl put on her red cloak and kissed her mother goodbye.

"Remember, go straight to Grandma's house," her mother cautioned. "Don't dawdle along the way and please don't talk to strangers! The woods are dangerous."

"Don't worry, mommy," said Little Red Riding Hood, "I'll be careful."

FIG. 7

802 — Once upon a time, there was a little girl who lived in a village near the forest. Whenever she went out, the little girl wore a red riding cloak, so everyone in the village called her Little Red Riding Hood.

One morning, Little Red Riding Hood asked her mother if she could go to visit her grandmother as it had been awhile since they'd seen each other.

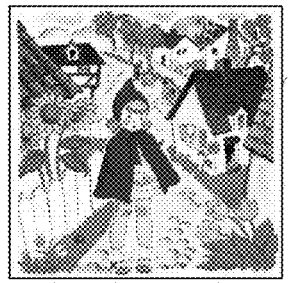
804

806 — "That's a good idea," her mother said. So they packed a nice basket for Little Red Riding Hood to take to her grandmother.

When the basket was ready, the little girl put on her red cloak and kissed her mother goodbye.

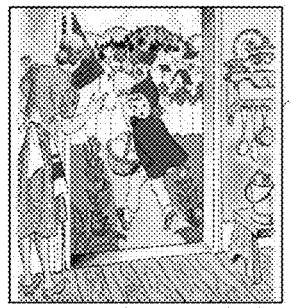
808

"Remember, go straight to Grandma's house," her mother cautioned. "Don't dawdle along the way and please don't talk to strangers! The woods are dangerous."

"Don't worry, mommy," said Little Red Riding Hood, "I'll be careful."

FIG. 8

ILLUSTRATING CONTEXT SENSITIVE TEXT

BACKGROUND

A large and growing population of users is enjoying entertainment through the consumption of digital content items, such as electronic books, articles, and so on. The users employ various electronic devices to consume such content items. Among these electronic devices are electronic book readers, cellular telephones, personal digital assistants (PDAs), portable media players, tablet computers, netbooks, personal computers, and the like. As the quantity of available electronic content continues to grow, making user experience with the electronic content more functional and enjoyable continues to be a priority.

BRIEF DESCRIPTION OF THE DRAWINGS

FIG. 7 shows exemplary textual content.

FIG. 8 illustrates the addition of images to the exemplary textual content of FIG. 7, in accordance with some embodiments of the invention.

DETAILED DESCRIPTION

Methods and systems for illustrating textual content to be presented on user devices are described. A user device may be any computing device that can connect to a network. Examples of such user devices include electronic book readers, cellular telephones, personal digital assistants (PDAs), portable media players, tablet computers, netbooks, and the like. A user device may connect to a network to obtain content items from an item providing system or to perform other activities. Content items may include electronic books (e-books), newspaper articles, journal articles, magazine articles, news feeds and blog feeds, or any other documents that contain textual content.

In one embodiment, textual content is parsed to identify contextual information associated with the textual content. The contextual information may include, for example, descriptive words, descriptive phrases, or content metadata (e.g., reading level, keywords or genre such as fictional content, management content or technical content). Based on the contextual information, various data repositories and databases are searched for illustrations applicable to the textual content. The illustrations may include images, videos, animations, and the like. Various data repositories and databases may include, for example, Internet resources, local or remote data stores specified by a user, local or remote data stores specified by an author of the textual content, and/or local or remote data stores specified by a publisher of the textual content.

In one embodiment, the found illustrations are filtered based on characteristics of the textual content (e.g., reading level or other content metadata) and/or characteristics of the illustrations (e.g., copyright data, author data). The remaining illustrations are then combined with the textual content to build a graphical story around the content.

Accordingly, an efficient mechanism is provided that automatically illustrates textual content and creates a visual story to correspond to the text. As a result, the user experience with electronic content becomes more functional and enjoyable.

Figure 1:
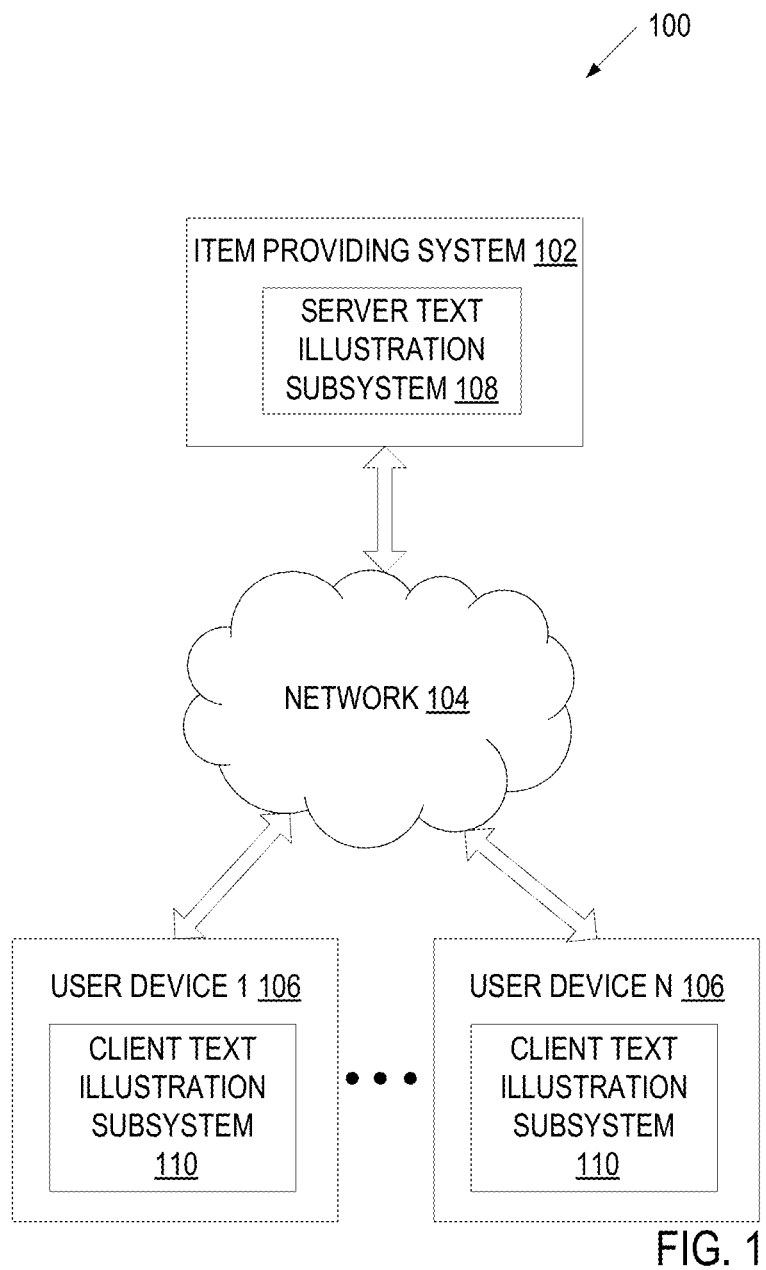
FIG. 1 is a block diagram of an exemplary network architecture in which embodiments of the invention may operate.

FIG. 1 is a block diagram of exemplary network architecture 100 in which embodiments of the invention may operate. The network architecture 100 may include an item providing system 102 and multiple user devices 106 coupled to the item providing system 102 via a network 104 (e.g., a public network such as the Internet, a private network such as a local area network (LAN), or a virtual private network (VPN)).

The user devices 106 are variously configured with different functionality to enable consumption of content items. As discussed above, the content items may include e-books, newspaper articles, journal articles, magazine articles, news feeds, and blog feeds, and other documents that contain textual content. The user devices 106 may include any type of content rendering devices such as electronic book readers, portable digital assistants, mobile phones, laptop computers, portable media players, tablet computers, cameras, video cameras, netbooks, notebooks, personal computers, desktop computers, gaming consoles, DVD players, media centers, or any other computing device.

The item providing system 102 provides items, upgrades, and/or other information to the user devices 106 registered with the item providing system 102 via the network 104. The item providing system 102 also receives various requests, instructions and other data from the user devices 106 via the network 104. The item providing system 102 may include one or more machines (e.g., one or more server computer systems, routers, gateways) that have processing and storage capabilities to provide the above functionality.

Communication between the item providing system 102 and a user device 106 may be enabled via any communication infrastructure. One example of such an infrastructure includes a combination of a wide area network (WAN) or a VPN and wireless infrastructure, which allows a user to use the user device 106 to purchase items and consume items without being tethered to the item providing system 102 via hardwired links. The wireless infrastructure may be provided by a wireless carrier system that can be implemented using various data processing equipment, communication towers, etc. Alternatively, or in addition, the wireless carrier system may rely on satellite technology to exchange information with the user device 106. Yet alternatively, or in combination, the wireless infrastructure may be provided by an access point (e.g., WiFi access point) provider system.

The communication infrastructure may also include a communication-enabling system that serves as an intermediary in passing information between the item providing system 102 and the wireless carrier. The communication-enabling system may communicate with the wireless carrier via a dedicated channel, and may communicate with the item providing system 102 via a non-dedicated communication mechanism, e.g., a public network such as the Internet.

Users of the user devices 106 can register with the item providing system 102 to receive various content items that may include, for example, e-books, articles and other documents. In one embodiment, the item providing system 102 includes a server text illustration subsystem 108 that automatically finds illustrations for textual content of e-books, articles and other documents, builds a graphical story around the textual content and provides the graphical story to one or more user devices 106. The illustrations may include images, videos, animations, and the like. The server text illustration subsystem 108 may find illustrations by searching one or more remote data repositories and databases accessible via Internet (e.g., using Google® Images, Google® Videos, Yahoo!® Images, Yahoo!® Videos). In addition, or alternatively, a user may specify a particular data store that should be used to obtain illustrations. For example, a user may submit one or more files or other data structures that include illustrations (e.g., images of characters) that should be used by the server text illustration subsystem 108. Further, an author or a publisher of the textual content may specify a particular data store that should be used by the server text illustration subsystem 108. For example, a publisher may provide a database of images for illustrating its books, thereby saving on costs associated with designated illustrators for its books.

In one embodiment, the server text illustration subsystem 108 adds illustrations to textual content when transforming textual content received from a publisher into a format understandable by user devices 106. In another embodiment, the server text illustration subsystem 108 adds illustrations to textual content upon receiving a user request to illustrate specific textual content or in response to any other request or event.

In one embodiment, a user device 106 hosts a client text illustration subsystem 110 that illustrates textual content received from the item providing system 102 (e.g., an e-book, a journal article or any other textual document) upon receiving the textual content from the item providing system or in real-time (e.g., as the textual content is being displayed or read aloud to the user by text-to-speech software). In addition, or alternatively, the client text illustration subsystem 110 may illustrate textual content specified by a user of the user device 106. For example, the client text illustration subsystem 110 may illustrate textual content created by the user (e.g., in real-time as the content is being created, or any time after the user has created the content). In another example, the client text illustration subsystem 110 may illustrate textual content that was not created by the user but rather identified by the user (e.g., via a URL, a file name or the like). The client text illustration subsystem 110 may operate in addition to the server text illustration subsystem 108 or instead of the server text illustration subsystem 108.

The client text illustration subsystem 110 may automatically find illustrations for the textual content by searching Internet (e.g., using Google® Images, Google® Videos, Yahoo!® Images, Yahoo!® Videos) or repositories or databases specified by the user. In addition or alternatively, the client text illustration subsystem 110 may use one or more predefined data stores for illustrating any textual content or one or more data stores specified in the metadata associated with the textual content (e.g., as specified by an author or publisher of the textual content). Upon finding an illustration that correspond to the textual content, the client text illustration subsystem 110 associates the illustrations with relevant portions of the textual content and presents the resulting graphical story to the user.

Figure 2:
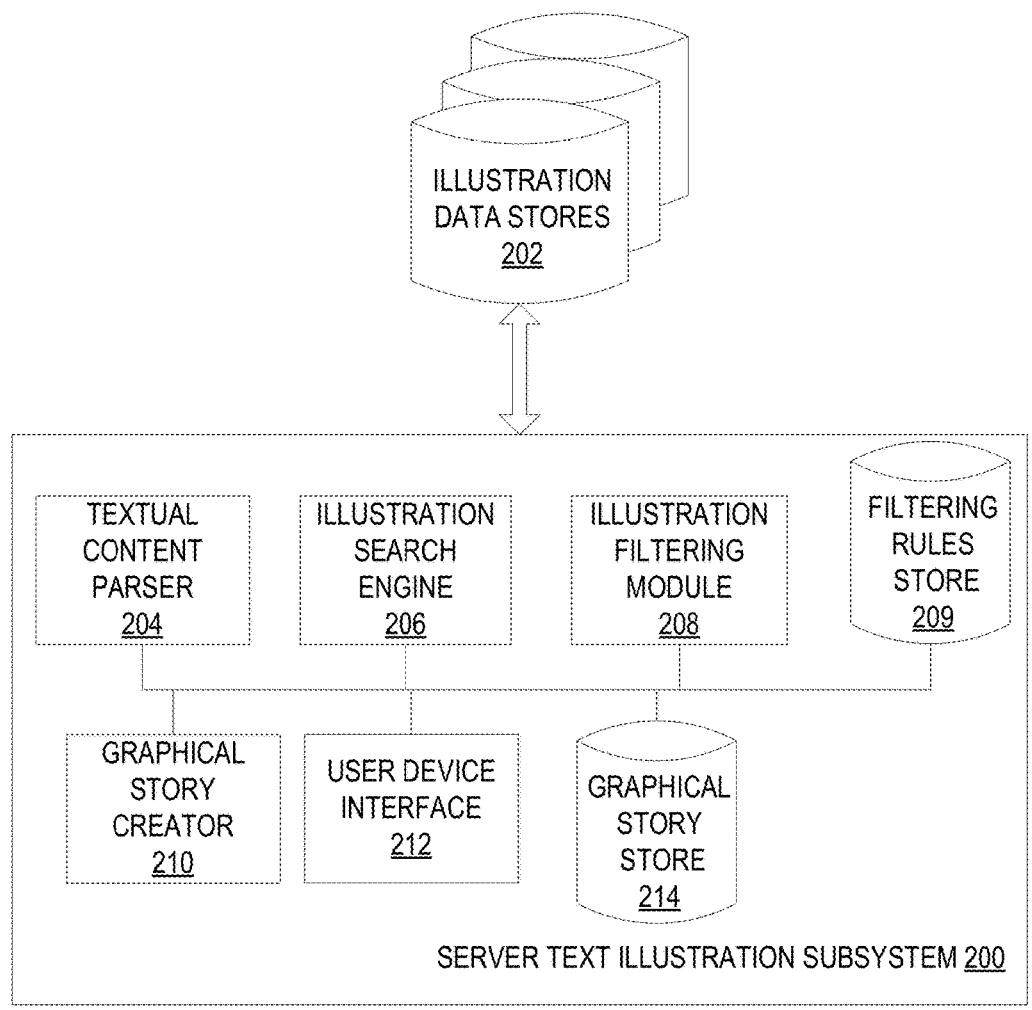
FIG. 2 is a block diagram of one embodiment of a server text illustration subsystem.

FIG. 2 is a block diagram of one embodiment of a server text illustration subsystem 200. The server text illustration subsystem 200 may be the same as the server text illustration subsystem 108 of FIG. 1. In one embodiment, the server text illustration subsystem 200 includes a textual content parser 204, an illustration search engine 206, an illustration filtering module 208, a filtering rules store 209, a graphical story creator 210, a user device interface 212, illustration data stores 202, and a graphical story store 214. The components of the server text illustration subsystem 200 may represent modules that can be combined together or separated into further modules, according to some embodiments. The server text illustration subsystem 200 may operate during content ingestion (when content is converted into a user device readable format) or upon a user request for content that does not include any illustrations at the time of the request, or in response to any other request or event.

The textual content parser 204 receives textual content from a publisher's system or any other source and parses it to identify contextual information associated with the textual content. The contextual information may include, for example, descriptive words, descriptive phrases, and/or the content metadata (e.g., reading level, keywords, genre such as fictional content, management content or technical content). The content metadata may be provided with the textual content or be determined using natural language processing.

The illustration search engine 206 uses the contextual information to search one or more data repositories and databases (data stores 202) for illustrations applicable to the textual content. The illustrations may include images, videos, animations, and the like. The data stores 202 may include, for example, data stores accessible via Internet, local or remote data stores specified by a user, local or remote data stores specified by an author of the textual content, and/or local or remote data stores specified by a publisher of the textual content.

The illustration filtering module 208 is responsible for identifying characteristics of the content and/or characteristics of the found illustrations, and filtering the found illustrations based on the characteristics of the textual content (e.g., a reading level or other metadata) and and/or characteristics of the illustrations (e.g., copyright data, author data). For example, based on the metadata or readability statistics associated with the textual content, the illustration filtering module 208 may determine that the textual content is intended for elementary school students and may drop illustrations that are inappropriate for such students. The illustration filtering module 208 may also determine that some of the found illustrations are subject to private ownership (e.g., as indicated by an up-to-date copyright notice, a watermark or metadata associated with an illustration) and may only keep those of the found illustrations that are in the public domain. In one embodiment, the illustration filtering module 208 uses filtering rules stored in the filtering rules store 209 to determine which illustrations should be filtered out. The filtering rules can be specified by a publisher of the textual content, an author of the textual content, an end user, an item providing system, etc. The filtering rules can be shared by all user device or be specific to a certain user device. In some embodiments, the filtering rules are partially or fully replicated on all or some user devices.

The graphical story creator 210 combines the remaining illustrations with the textual content and stores the resulting graphical story in the graphical story store 214. In one embodiment, the graphical story creator 210 is also responsible for composing the illustrations into a final rendering. In particular, the graphical story creator 210 may combine multiple videos together or may compose several images into a scene. For example, the graphical story creator 210 may take a background picture (a town), add an actor (a girl), and add appropriate clothes (the red riding hood), composing the images into a final rendering.

The user interface 212 may receive a request of a user device and provide the graphical story to the user device. In one embodiment, the user interface 212 checks weather the requestor is a subscriber of a text illustration service. If not, the user interface 212 provides only the textual content to the requestor. If so, the user interface 212 provides a corresponding graphical story to the requestor. In one embodiment, subscribers of the text illustration service are charged a fee (e.g., a monthly fee or a fee per each illustrated item).

In one embodiment, a user may review the graphical story and send a request to re-create the graphical story for the textual content (e.g., to obtain a story with different illustrations). Upon receiving such a request from a user device, the user interface 212 may invoke the illustration search engine 206 to repeat the illustration process.

Any of the illustration data stores 202, the filtering rules store 209 and the graphical story store 214 may be local or remote and may represent a single data structure or multiple data structures (databases, repositories, files, etc.) residing on one or more mass storage devices, such as magnetic or optical storage based disks, solid-state drives (SSDs) or hard drives.

Figure 3:
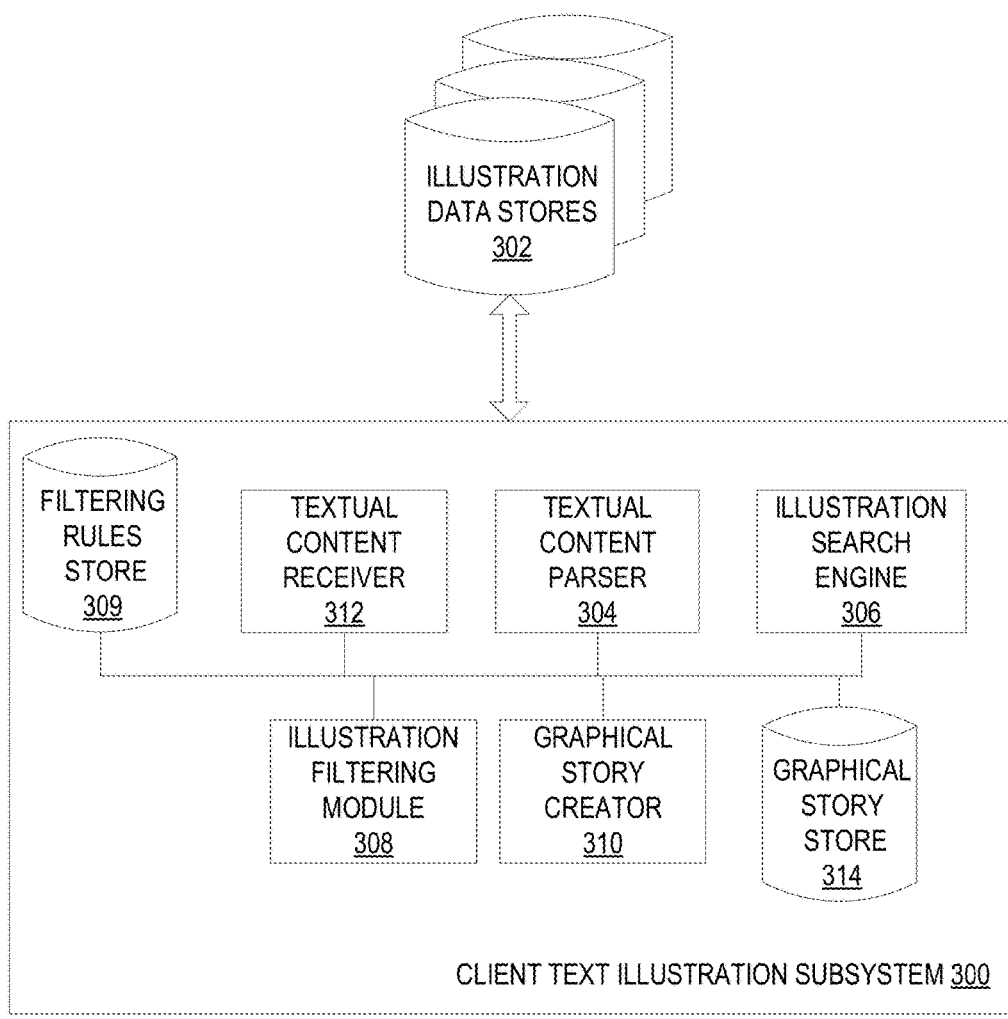
FIG. 3 is a block diagram of one embodiment of a client text illustration subsystem.

FIG. 3 is a block diagram of one embodiment of a client text illustration subsystem 300. The client text illustration subsystem 300 may be the same as the client text illustration subsystem 110 of FIG. 1. In one embodiment, the client text illustration subsystem 300 includes a textual content receiver 312, a textual content parser 304, an illustration search engine 306, an illustration filtering module 308, a filtering rules store 309, a graphical story creator 310, illustration data stores 302, and a graphical story store 314. The components of the client text illustration subsystem 300 may represent modules that can be combined together or separated into further modules, according to some embodiments.

The textual content receiver 312 identifies textual content that needs to be illustrated. This content may be textual content received from the item providing system, or textual content requested by the user to be illustrated, or textual content being created by the user, or textual content being displayed or read aloud to the user.

The textual content parser 304 parses the textual content to identify contextual information associated with the textual content. The contextual information may include, for example, descriptive words, descriptive phrases, and/or content metadata (e.g., reading level, keywords, genre such as fictional content, management content or technical content). The content metadata may be provided with the textual content or be determined using natural language processing.

The illustration search engine 306 uses the contextual information to generate a query and search one or more data repositories and databases (data stores 302) using the query to find illustrations applicable to the textual content. The data stores 302 may include, for example, data stores accessible via Internet, local or remote data stores specified by a user, local or remote data stores specified by an author of the textual content, and/or local or remote data stores specified by a publisher of the textual content.

The illustration filtering module 308 is responsible for identifying characteristics of the content and/or characteristics of the found illustrations, and filtering the found illustrations based on the characteristics of the textual content (e.g., a reading level, the content type) and/or characteristics of the illustrations (e.g., copyright data, author data). In addition, the illustration filtering module 308 may use user profile or user preferences stored on the user device to identify undesirable illustration parameters and to filter the found illustrations using the undesirable illustration parameters. The illustration filtering module 308 may also determine that some of the found illustrations are subject to private ownership (e.g., as indicated by an up-to-date copyright notice, a watermark or metadata associated with an illustration) and may only keep those of the found illustrations that are in the public domain.

In one embodiment, the illustration filtering module 308 uses filtering rules stored in the filtering rules store 309 to determine which illustrations should be filtered out. The filtering rules can be specified by a publisher of the textual content, an author of the textual content, an end user, an item providing system, etc. The filtering rules can be fully or partially replicated from a filtering rules store of the item providing system.

The graphical story creator 310 associates the remaining illustrations with relevant portions of the textual content and presents the resulting graphical story to the user. In one embodiment, the graphical story creator 310 is also responsible for composing the illustrations into a final rendering. In particular, the graphical story creator 310 may combine multiple videos together or may compose several images into a scene. In one embodiment, a user may review the graphical story and request that the graphical story be re-created for the textual content (e.g., using different illustrations). Upon receiving such a request from the user, the illustration search engine 306 is invoked to repeat the illustration process.

In one embodiment, the graphical story creator 310 stores the resulting graphical story in the graphical story store 314 for subsequent presentation to the user. Alternatively, the resulting graphical story is not stored in the graphical story store 314 but rather is re-created each time it is presented to the user. In one embodiment, the graphical story creator 310 provides the resulting graphical story to the item providing system to be able to share it with other users.

Any of the illustration data stores 302, the filtering rules store 309 and the graphical story store 314 may be local or remote and may represent a single data structure or multiple data structures (databases, repositories, files, etc.) residing on one or more mass storage devices, such as magnetic or optical storage based disks, solid-state drives (SSDs) or hard drives.

Figure 4:
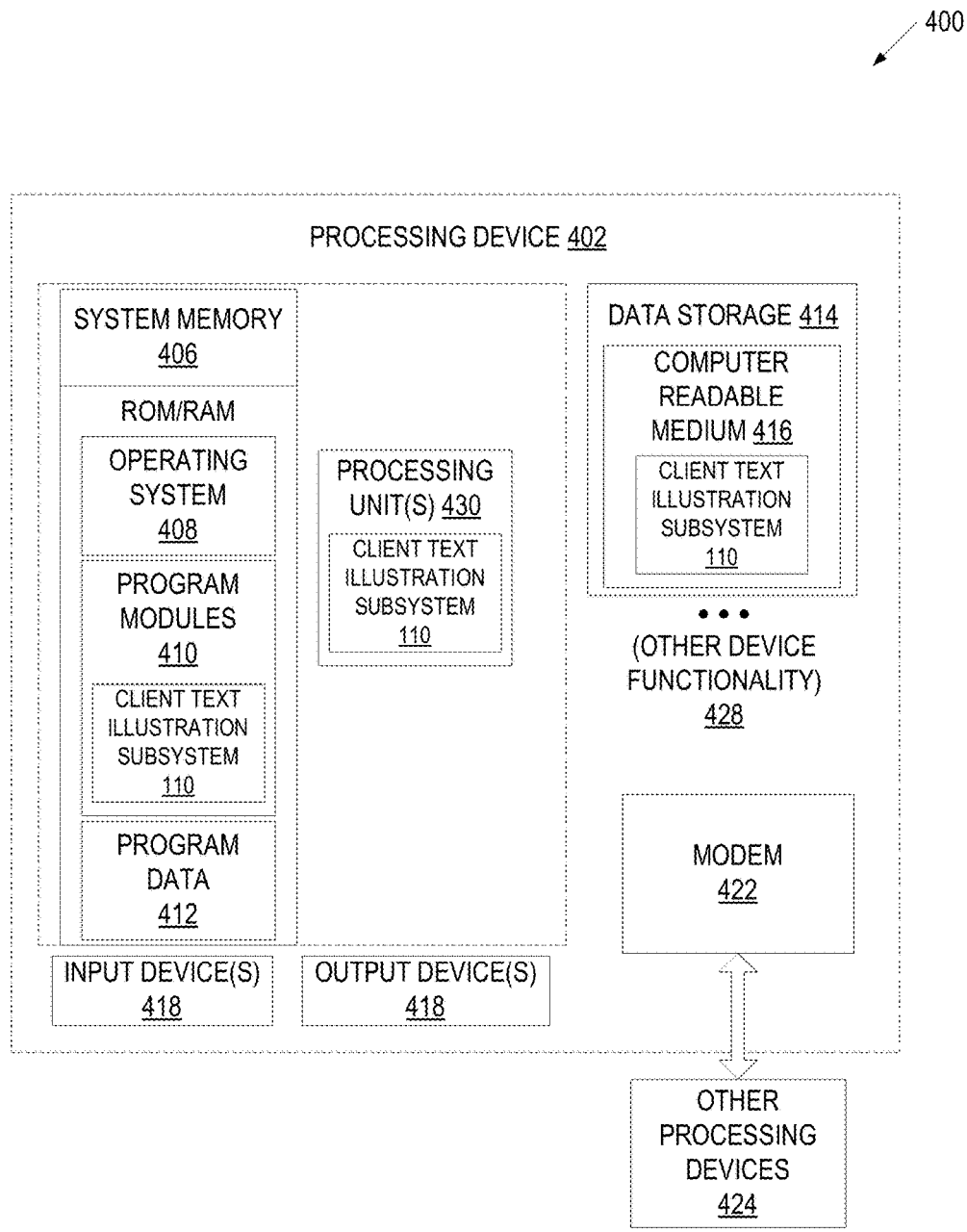
FIG. 4 is a block diagram illustrating an exemplary user device.

FIG. 4 is a block diagram illustrating an exemplary user device 400. The user device 400 may be the same as user device 106 of FIG. 1 and may be any type of computing device such as an electronic book reader, a PDA, a mobile phone, a laptop computer, a portable media player, a tablet computer, a camera, a video camera, a netbook, a personal computer, a desktop computer, a gaming console, a DVD player, a media center, and the like.

The user device 400 includes one or more processing units 404, such as one or more CPUs. The user device 400 also includes system memory 406, which may correspond to any combination of volatile and/or non-volatile storage mechanisms. The system memory 406 may store information which provides an operating system component 408, various program modules 410 including client text illustration subsystem 110, program data 412, and/or other components. The user device 400 performs functions by using the processing unit(s) 404 to execute the client text illustration subsystem 110 and other instructions provided by the system memory 406.

The user device 400 may also include a data storage device 414 that may consist of one or more types of removable storage and/or one or more types of non-removal storage. The data storage device 414 may include a computer-readable medium 416 on which is stored one or more sets of instructions (e.g., instructions of the client text illustration subsystem 110) embodying any one or more of the methodologies or functions described herein. As shown, instructions of the client text illustration subsystem 10 may also reside, completely or at least partially, within the system memory 406 and/or within the processing unit(s) 430 during execution thereof by the user device 400, the system memory 406 and the processing unit(s) 430 also constituting computer-readable media. The instructions of the client text illustration subsystem 110 may further be transmitted or received over a network.

The user device 400 may also include one or more input devices 418 (keyboard, mouse device, specialized selection keys, etc.) and one or more output devices 420 (displays, printers, audio output mechanisms, etc.). The user device 400 may further include a wireless modem 422 to allow the user device 400 to communicate via a wireless network with other computing devices 424, such as remote computers, the item providing system, and so forth. The wireless modem 422 may allow the user device 400 to receive a telephone ring and also communicate with the item providing system in a data mode. The wireless modem 422 may provide network connectivity using any type of mobile network technology including, for example, cellular digital packet data (CDPD), general packet radio service (GPRS), enhanced data rates for GSM evolution (EDGE), universal mobile telecommunications system (UMTS), 1 times radio transmission technology (1×RTT), evaluation data optimized (EVDO), high-speed downlink packet access (HSDPA), WiFi, long term evaluation (LTE) and WiMax.

The above-enumerated list of modules is representative and is not exhaustive of the types of functions performed by the user device 400. As indicated by the label "Other Device Functionality" 428, the user device 400 may include additional functions.

Figure 5:
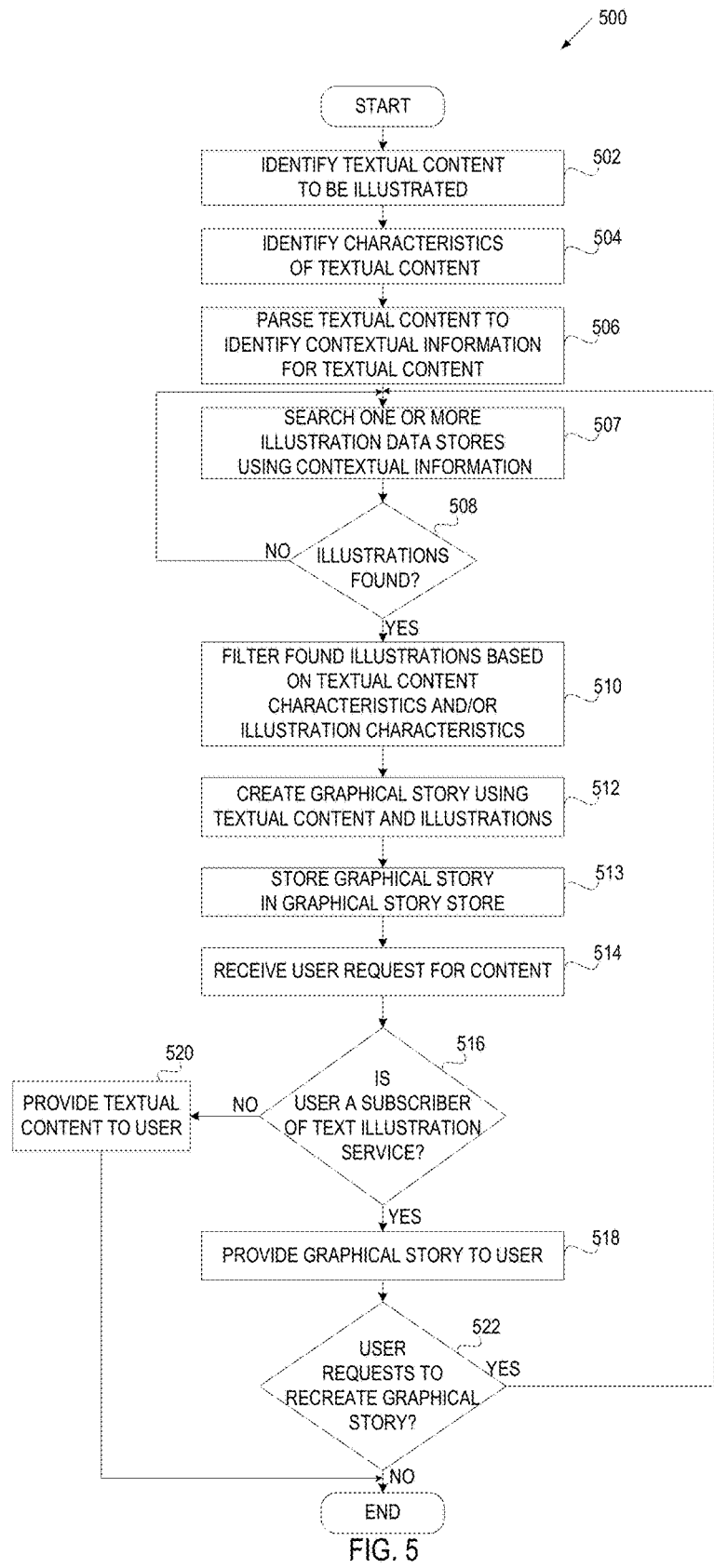
FIG. 5 is a flow diagram of one embodiment of a server-side method for illustrating textual content.

FIG. 5 is a flow diagram of one embodiment of a server-side method 500 for illustrating textual content. The method is performed by processing logic that may comprise hardware (circuitry, dedicated logic, etc.), software (such as is run on a general purpose computer system or a dedicated machine), or a combination of both. In one embodiment, the method is performed by a server (e.g., item providing system 102 of FIG. 1).

Referring to FIG. 5, method 500 begins with the item providing system identifying textual content to be illustrated (block 502). The content to be illustrated may be identified upon receiving a content item (e.g., an e-book, an article, or any other electronic document) from a publisher or a user and determining that the content item does not include any illustrations. Alternatively, the content to be illustrated may be identified upon receiving an illustration request from a user or any other source.

At block 504, the item providing system identifies characteristics (e.g., reading level, content type and the like) of the textual content. These characteristics may be identified using metadata associated with the textual content and/or natural language processing.

At block 506, the item providing system parses the textual content to identify contextual information associated with the textual content. The contextual information may include, for example, descriptive words, descriptive phrases, and/or content metadata.

At block 507, the item providing system uses the contextual information to search one or more data repositories and databases for illustrations applicable to the textual content. The illustrations may include images, videos, animations, and the like. The data repositories and databases may include, for example, data stores accessible via Internet, local or remote data stores specified by a user, local or remote data stores specified by an author of the textual content, and/or local or remote data stores specified by a publisher of the textual content. In one embodiment, the item providing system creates a query based on the contextual information and searches the data stores using the created query. A query may include one or more elements of the contextual information such as one or more keywords or phrases, ratings of keywords or phrases, reading level, content genre, and so on.

At block 508, the item providing system determines whether any illustrations have been found. If not, the method returns to block 507. If so, the item providing system filters the found illustrations based on the characteristics of the textual content (e.g., a reading level, the content type) and/or characteristics of the illustrations (e.g., copyright data, author data) at block 510. In one embodiment, the item providing system uses predefined filtering rules to determine which illustration should be filtered out.

At block 512, the item providing system combines the remaining illustrations with the textual content to create a visual story around the content. At block 513, the item providing system stores the resulting graphical story in a graphical story store.

Subsequently, at block 514, the item providing system receives a user request for content. In response, the item providing system determines whether the user is a subscriber of a text illustration service (block 516). If not, the item providing system provides the textual content in its original form (without subsequently found illustrations) to the user (block 520). If so, the item providing system provides a corresponding graphical story to the user (block 518). If the item providing system receives a user request to re-create a graphical story for the textual content (block 522), the method returns to block 507 to repeat the illustration process.

Figure 6:
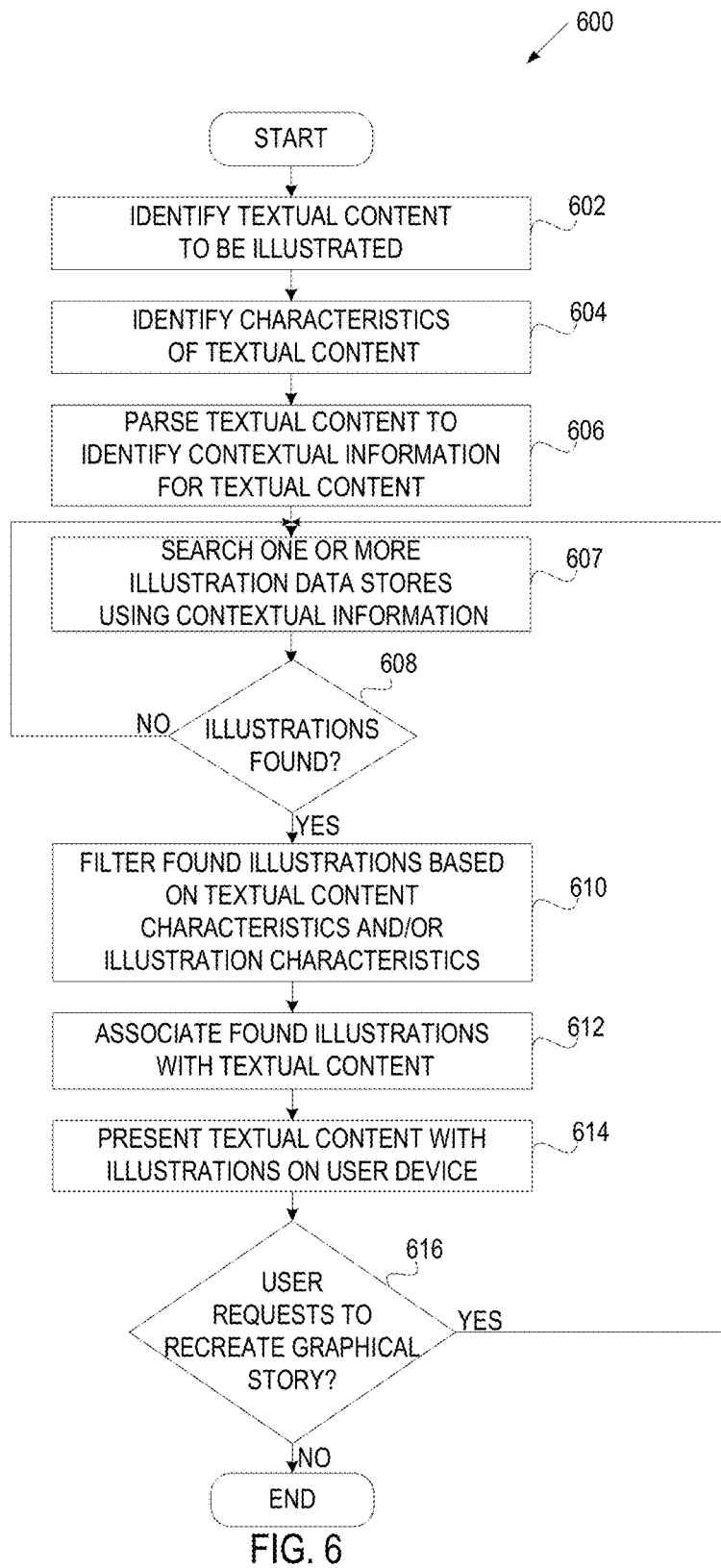
FIG. 6 is a flow diagram of one embodiment of a client-side method for illustrating textual content.

FIG. 6 is a flow diagram of one embodiment of a client-side method 600 for illustrating textual content. The method is performed by processing logic that may comprise hardware (circuitry, dedicated logic, etc.), software (such as is run on a general purpose computer system or a dedicated machine), or a combination of both. In one embodiment, the method is performed by a user device (e.g., user device 106 of FIG. 1).

Referring to FIG. 6, method 600 begins with the user device identifying textual content to be illustrated (block 602). The content to be illustrated may be identified upon receiving a content item (e.g., an e-book, an article, or any other electronic document) from the item providing system and determining that the content item does not include any illustrations. Alternatively, the content to be illustrated may be identified upon receiving an illustration request from the user, or upon determining that the textual content that is being displayed or read aloud does not include any illustrations, or upon detecting textual content being created by the user.

At block 604, the user device identifies characteristics (e.g., reading level or other metadata) of the textual content. The metadata may be provided with the textual content and/or be determined using natural language processing.

At block 606, the user device parses the textual content to identify contextual information associated with the textual content. The contextual information may include, for example, descriptive words, descriptive phrases, and/or content metadata.

At block 607, the user device uses the contextual information to search one or more data repositories and databases for illustrations applicable to the textual content. The data repositories and databases may include, for example, data stores accessible via Internet, local or remote data stores specified by the user, and/or local or remote data stores identified in the metadata associated with the textual content (e.g., as provided by an author or a publisher of the textual content).

At block 608, the user device determines whether any illustrations have been found. If not, the method returns to block 607. If so, the user device filters the found illustrations based on the characteristics of the textual content and/or characteristics of the illustrations (e.g., copyright data, author data), and/or user profile and preferences (block 610). In one embodiment, the user device uses predefined filtering rules to determine which illustration should be filtered out.

At block 612, the user device associates the remaining illustrations with relevant portions of the textual content to create a visual story around the content. At block 614, the user device presents the textual content with the illustrations to the user. If the use device receives a user request to re-create a graphical story for the textual content (block 622), the method returns to block 607 to repeat the illustration process.

FIG. 7 shows exemplary textual content 700. In particular, content 700 may be a portion of an e-book about Little Red Riding Hood. As discussed above, when illustrating such an e-book, the item providing system or a user device may parse content 700 to identify contextual information for the content 700. For example, the contextual information may include phrases 702 and 704, as well as phrases 706 and 708. The item providing system or the user device may also perform the natural language processing of content 700 and determine that it is a children's book.

FIG. 8 illustrates the addition of images to the exemplary textual content of FIG. 7, in accordance with some embodiments of the invention. In particular, based on phrases 702 and 704 shown in FIG. 7, the item providing system or the user device may search the Internet (e.g., using Google Images) to find images available for such phrases, and then filter these images based on the content characteristics (e.g., children's book, fiction) and image characteristics (e.g., public domain data). In addition, the item providing system or the user device may filter the found images based on illustration requirements provided by a user, a publisher or an author. For example, the requirements may specify a desired style, color, size, etc. As a result, the item providing system or the user device may identify image 804 and associate it with portion 802 of the textual content.

Similarly, the item proving system or the user device may use phrases 706 and 708 shown in FIG. 7 to find a corresponding image 808 for portion 806 of the textual content and associate image 808 with portion 806. Subsequently, when the content is presented to the user, the images 804 and 808 can be displayed next to the corresponding portions 802 and 806, or underneath the corresponding portions (not shown).

Figure 9:
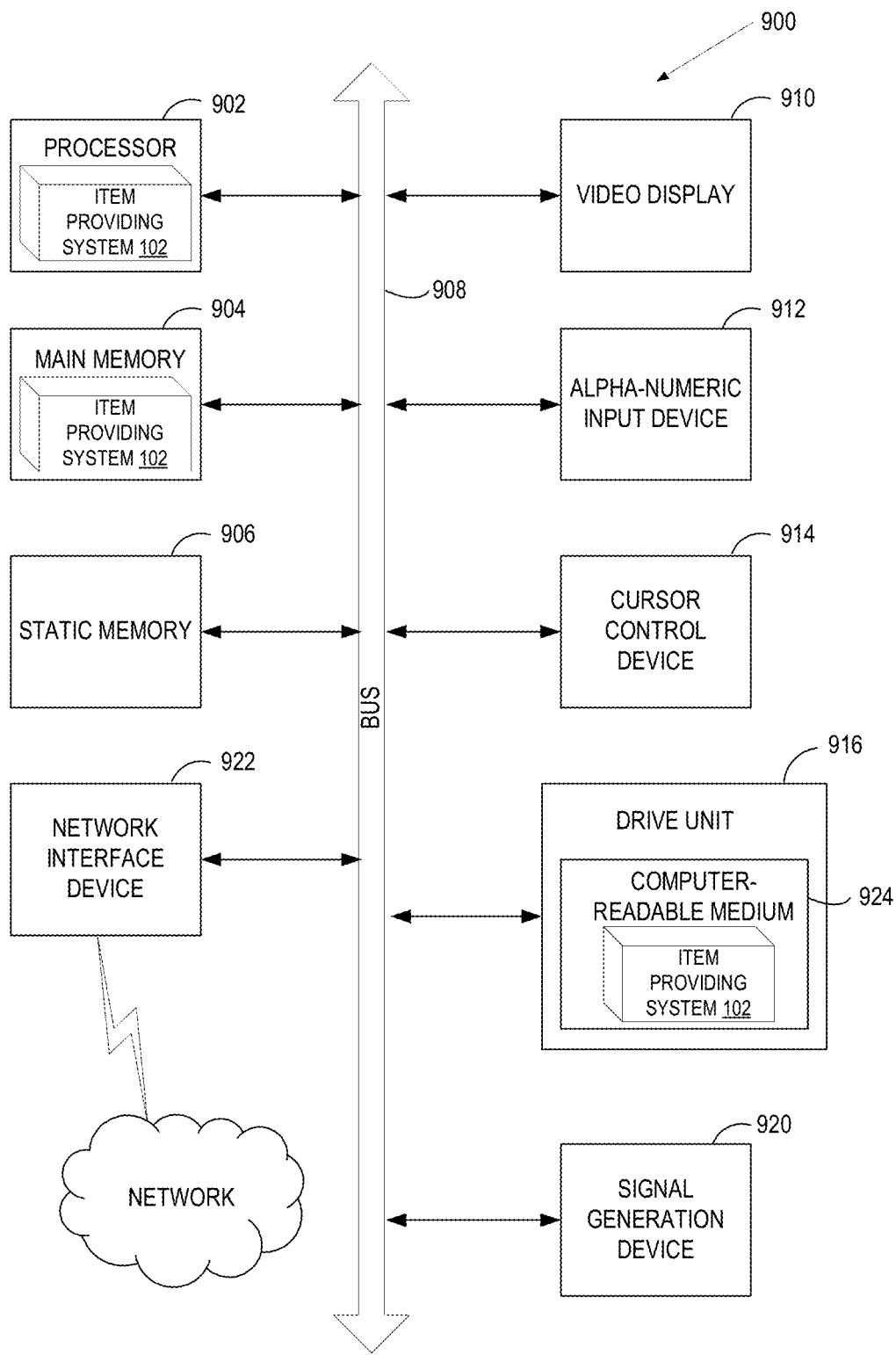
FIG. 9 illustrates an exemplary item providing system.

FIG. 9 illustrates an exemplary item providing system 900 in the form of a computer system within which a set of instructions, for causing the machine to perform any one or more of the methodologies discussed herein, may be executed. In some embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 900 includes a processing system (processor) 902, a main memory 904 (e.g., read-only memory (ROM), flash memory, dynamic random access memory (DRAM) such as synchronous DRAM (SDRAM)), a static memory 906 (e.g., flash memory, static random access memory (SRAM)), and a data storage device 916, which communicate with each other via a bus 906.

Processor 902 represents one or more general-purpose processing devices such as a microprocessor, central processing unit, or the like. More particularly, the processor 902 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 902 may also be one or more special-purpose processing devices such as an application specific integrated circuit (ASIC), a field programmable gate array (FPGA), a digital signal processor (DSP), network processor, or the like. The processor 902 is configured to execute the server text illustration subsystem 108 for performing the operations and steps discussed herein.

The computer system 900 may further include a network interface device 922. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), and a signal generation device 920 (e.g., a speaker).

A drive unit 916 may include a computer-readable medium 924 on which is stored one or more sets of instructions (e.g., instructions of server text illustration subsystem 108) embodying any one or more of the methodologies or functions described herein. The instructions of the server text illustration subsystem 108 may also reside, completely or at least partially, within the main memory 904 and/or within the processor 902 during execution thereof by the computer system 900, the main memory 904 and the processor 902 also constituting computer-readable media. The instructions of the server text illustration subsystem 108 may further be transmitted or received over a network via the network interface device 922.

While the computer-readable storage medium 924 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying", "creating", "notifying", "allowing" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method, implemented by a computer system programmed to perform the following, comprising:
   parsing textual content to identify contextual information for the textual content and characteristics of the textual content, wherein the characteristics are identified using metadata associated with the textual content;
   searching one or more data stores for illustrations corresponding to the contextual information;
   selecting one or more illustrations found in the one or more data stores using the characteristics of the textual content;
   associating at least one illustration of the one or more illustrations with the textual content to supplement the textual content with a graphical representation; and
   causing presentation of the textual content with the at least one illustration,
   wherein the characteristics of the textual content comprise at least one of a reading level associated with the textual content or a genre of the textual content.

2. The method of claim 1 wherein the at least one illustration comprises one or more of an image, a scene created from a plurality of images, a video or an animation.

3. The method of claim 1 wherein the contextual information comprises at least one of a descriptive word, a descriptive phrase, or content metadata.

4. The method of claim 3 further comprising:
   identifying the content metadata based on at least one of metadata provided with the content or a natural language processing.

5. The method of claim 1 wherein the one or more data stores comprise at least one of an internet resource, a data store identified by a user, a data store identified by an author of the textual content, or a data store identified by a publisher of the textual content.

6. The method of claim 1 further comprising:
   identifying characteristics of the illustrations; and
   utilizing the characteristics of the illustrations when filtering the illustrations.

7. The method of claim 1 wherein the characteristics of the textual content are identified using at least one of historical data associated with the textual content or a natural language processing.

8. The method of claim 6 wherein the characteristics of the illustrations comprise at least one of copyright information or illustration author data.

9. The method of claim 6 wherein the characteristics of the illustrations are identified using metadata associated with the illustrations.

10. The method of claim 1 further comprising:
    maintaining predefined filtering rules; and
    utilizing the predefined filtering rules when filtering the illustrations found in the one or more data stores.

11. The method of claim 1 wherein the textual content is any one of an electronic book, an electronic document or a blog feed.

12. The method of claim 1 wherein the computer system is any one of an item providing system or a user device.

13. The method of claim 1 wherein the parsing of the textual content is performed after a creation of the textual content is completed or during the creation of the textual content.

14. The method of claim 1 further comprising:
    prior to the parsing of the textual content, determining that a user is a subscriber of a text illustration service.

15. The method of claim 1 further comprising:
    composing two or more illustrations into a final rendering.

16. The method of claim 1 further comprising:
receiving a user request to re-create the graphical story for the textual content; and
repeating the searching, the associating and the causing to create a new graphical story for the textual content.

17. A computer readable storage medium including instructions that, when executed by one or more processors, cause the one or more processors to:
identify contextual information for textual content and characteristics of the textual content, wherein the characteristics are identified using metadata associated with the textual content, the characteristics of the textual content comprising at least one of a reading level associated with the textual content or a genre of the textual content;
search one or more data stores for illustrations corresponding to the contextual information;
select one or more illustrations found in the one or more data stores using the characteristics of the textual content;
create a graphical story combining the textual content with at least one illustration of the one or more illustrations; and
provide the graphical story to one or more user devices.

18. The computer-readable storage medium of claim 17, wherein the instructions further cause the one or more processors to:
store the graphical story in a graphical story data store.

19. The computer-readable storage medium of claim 17 wherein the illustrations comprise one or more of an image, a scene created from a plurality of images, a video or an animation.

20. The computer-readable storage medium of claim 17 wherein the contextual information comprises at least one of a descriptive word, a descriptive phrase, or content metadata.

21. The computer-readable storage medium of claim 17 wherein the one or more data stores comprise at least one of an internet resource, a data store identified by the user, a data store identified by an author of the textual content, or a data store identified by a publisher of the textual content.

22. A computer system comprising:
a memory;
one or more processors, coupled to the memory, the one or more processors to:
identify textual content for illustration;
find at least one illustration corresponding to context of the textual content;
select one or more illustrations found in the one or more data stores using characteristics of the textual content, wherein the characteristics are identified using metadata associated with the textual content, the characteristics of the textual content comprising at least one of a reading level associated with the textual content or a genre of the textual content; and
present a graphical story combining the textual content with the at least one illustration of the one or more illustrations to a user.

23. The system of claim 22 wherein the context comprises at least one of a descriptive word, a descriptive phrase, or content metadata.

24. The system of claim 22 wherein the text illustration subsystem is to find at least one illustration by searching at least one of an internet resource, a data store identified by the user, a data store identified by an author of the textual content, or a data store identified by a publisher of the textual content.

25. The system of claim 22 wherein the text illustration subsystem is further to receive a user request to re-create the graphical story for the textual content, and to create a new graphical story for the textual content.

* * * * *